Oct. 2, 1956

E. B. NOLT ET AL 2,764,931

DOUBLE TWIST WIRE TIE MECHANISM

Filed March 9, 1953

Inventors:
Edwin B. Nolt
John P. Tarbox
By Richard E. Babcock Jr.
Attorney

Oct. 2, 1956    E. B. NOLT ET AL    2,764,931
DOUBLE TWIST WIRE TIE MECHANISM

Filed March 9, 1953    8 Sheets-Sheet 7

Inventors
Edwin B. Nolt
John P. Tarbox
By Richard E. Babcock Jr.
Attorney

Oct. 2, 1956 E. B. NOLT ET AL 2,764,931
DOUBLE TWIST WIRE TIE MECHANISM
Filed March 9, 1953 8 Sheets-Sheet 8

Inventors:
Edwin B. Nolt
John P. Tarbox
By Richard E. Babcock Jr.
Attorney

United States Patent Office 2,764,931
Patented Oct. 2, 1956

2,764,931

DOUBLE TWIST WIRE TIE MECHANISM

Edwin B. Nolt, New Holland, and John P. Tarbox, Philadelphia, Pa., assignors, by mesne assignments, to Sperry Rand Corporation, New Holland, Pa., a corporation of Delaware Application March 9, 1953, Serial No. 341,056

19 Claims. (Cl. 100—21)

Double twist wire tie mechanisms are the subject of this invention. Such mechanisms have heretofore been nearly if not quite always so arranged as to effect the tie upon the side of the bale. Those attempts to effect wire joints within the end areas of bales (rather than at the corners) have not met with general favor, yet the desirability of joints within the end areas of bales is well recognized. Bales in being trucked and stored and otherwise handled, are more often grasped by the sides of wire ties than by the ends of such ties and when the joints are effected in the sides the sharp ends of the wire not infrequently stab or cut a man's hands. Moreover, in climbing over trucked or stored bales, since these bales are usually trucked and stored on their sides, knees and feet have been known to be cut or scratched. This of course happens more often with barefoot farm boys than with men. Furthermore bales are pulled and slid on their sides and they can be moved more easily if the twisted joints are not where they can catch on the hay or wire of other bales over which they are being moved.

While it is the prime object of our invention to produce a wire tie joint within the end area of the bale it is also our object to make such a mechanism so primely practical as to meet with commercial favor.

A central object of our invention is to achieve the joint in the end area of the bale through a mechanism which draws the wire for the tying from about a single spool and effects but one joint per tie as distinguished from the two spools per tie and two joints as has been proposed heretofore.

There are yet other objects and advantages to be attained which will become apparent through the accompanying specification and drawings or through use of the invention or both.

In seeking the objects of our invention, we make use of a twisting mechanism for the double twist joint supported from and moving with one of the needles and accomplish the lay of the free end strand which enters the joint through and by virtue of the entrance of the twister supporting needle into the bale case in juxtaposition to the end area of the bale. We achieve the lay of the bale strand which enters the joint in overlapped relation to the free end strand, and drive the twister mechanism carried by this needle, through a strand laying engagement of the wire being drawn from the spool as the bale is being formed by a coacting needle projected into the bale case from the opposite side and through a driving engagement of this latter needle with the twister mechanism. The two needles together which so effect a joint constitute a pair. The first named which carries the twister mechanism and effects the lay of the free end, we operate from the top of the bale case. The second named which effects the lay of the bale strand and drives the twister mechanism, we operate generally in the same plane but from the bottom of the bale case. We make use of the twister-driving movement and some additional movement of the second named needle to draw enough extra length of wire from the spool beyond the needs of the joint being formed to constitute the free end length of the next succeeding tie to be made, and utilize the extreme of this movement to release the free end of the tie being made from the upper needle, to cut the finished joint from the spool strand and to place the free end length so severed under the control of the upper needle.

In doing this there is introduced a method of deriving and handling the free end which is believed to be entirely novel. The lower needle not only draws wire which is to enter the free end but also draws a sufficient length of that free end wire to reach all the way from the upper rear corner of the bale to and through the completed joint, with enough to spare to be retained in the hold of the upper needle until the joint is complete. The extremity of this free end length is deformed at the time it is severed from the joint in a manner to insure the hold of the upper needle upon it during the formation of the bale, during the lay and until the joint itself is complete. The length of wire so drawn is transferred to the control of the upper needle. That control is continued in the upper needle during its withdrawal, the free end length is relieved of its slack and placed under tension externally of the bale case during withdrawal, and the free end length maintained in this condition and free of the bale until the bale is completed and ready for the new joint.

In the accompanying drawings we show that embodiment of our invention which we at present deem best suited to the carrying out of its method and the attainment of its object. Without doubt others are equally feasible and some may prove to be even more feasible as experience may be had with them.

Figs. 19 to 28 are schematic vertical elevations showing diagrammatically the relationship of the upper and lower needles and the joint forming parts carried by and associated with them, in the succession of relative positions which they occupy in the formation of the double twist wire joint; Fig. 19 beginning the series of successive positions in showing the relationship of the parts at rest just after an advance joint has been completed and a small portion of the succeeding bale has been formed, Fig. 20 continuing with a showing of the parts as the new bale attains its metered length and is ready for its tie to be joined, the needles being shown at the inception of their movements; the intermediate views showing the various stages in the operation of forming the tie; and the final view, Fig. 28, showing the completed joint and the parts nearing the positions of rest from which they started in Fig. 19. Each one of these figures and stage of the operation which it illustrates will be referred to in detail in the detailed description of the operation which follows the description of the construction of the mechanism next ensuing.

In the general views of Figs. 1 to 3, 50 designates the bale case in general, 51 its top, 52 its bottom, 53 its right hand side looking in the direction in which bales are formed and delivered, and 54 the left hand, usually the infeed side.

The bale case is slotted at 60 as usual both top and bottom to permit the passage of the needles therethrough, and in this case the slots are somewhat wider than usual in order to permit the passage therethrough of the twister and other mechanism borne by the needles and afford the needles latitude of movement where needful. Since the ties are to be joined in the end area of the bale, slot 60 may or may not be longitudinally extended forwardly as in the case when the ties are joined on a side of the bale, usually on the top side. However, they are shown so extended as at 61—61 to facilitate the employment of the central area 62 in connection with bale tensioning means (not shown).

The wire tying mechanism at large is mounted mainly on the top 51 of the bale case but the U-shaped yoke which bears the lower needles is mounted from the sides 53, 54, and the needle guards are mounted from the bottom 52. The top 51 is preferably made of double thickness by welding thereon a registering plate 65, shown in Figures 1 and 3, to provide the more rigid foundation for the driving portions of the mechanism.

It will be convenient preliminarily to generally identify the various portions of the wire entering the tie, and the various mechanisms which comprise the tier as a whole. The wire being drawn from the coil supply (itself not shown) is 70, the needle loop 71, its bale strand 72, its spool strand 73, its bight 74, the free end strand 75, the extremity of the free end strand 76, the double twisted joint 77, and the complete tie about the bale 78.

In general designation, the twister mechanism per se carried by the upper needles is 100, the upper and lower needle means are designated 200, the primary timing mechanism having to do especially with the needle movement 300, the bale length metering mechanism 400, the free end control mechanism 500, and the needle drive mechanism 600.

The twister mechanism 100 carried by the upper needles are best shown in detail in Figs. 4, 5, 14 and 15. Their principal element is the slotted twister pinion 101 into the radial slot 102 of which the strands to be twisted together are received and held in superimposed relation for the twisting. These pinions are driven from a chain of multiplying gears 103, 104, 105, 106 of which gears 104, 105 are double gears which effect the application of power from axis shaft 107 which is horizontally extending to axis shaft 108 of gear 103 which is vertically extending and parallel to the axis of revolution of twister pinion 101. All of these gears with the exception of gear 106 are mounted in a common housing 110 appropriately rigidly secured by means not shown to the body of the needle which bears the twister mechanism 100. The housing 110 provides the usual peripheral bearing for twister pinion 101, but is open for strand laying about 90 degrees instead of the usual width of strand receiving slot 102, whereby slot 102 may be faced either forwardly to receive the free end strand 75 or laterally to receive the bale strand 72 as will hereinafter appear.

The twister drive means is carried upon the coacting lower needle of the needle mechanism 200. It comprises first a lug 115 of substantially rectangular cross-section (see especially the dotted line showing in Figs. 4, 14 and 15) carried by the lower needle in a position to engage the cam-shaped arm 116 keyed to axis 107 of twister driving gear 106. The relationship of driving lug 115 and cam arm 116 in shape and relative paths of movement as established by the needle movements is such that when lug 115 engages cam arm 116 as the needles are projected into the casing twister pinion 101 is shifted 90 degrees to carry slot 102 from its forwardly facing position shown in Fig. 14 to its laterally facing position shown in Fig. 15. Conversely when parts 115, 116 engage during the retracting movement of the needles, pinion 101 is shifted in the opposite direction to change the position of slot 102 from its lateral to forward position.

In each of these positions a spring pressed ball retaining means (not numbered) seating in sockets 118 appropriately apart in the face of bevel gear 105 retains the gear train and slot 102 in the adjusted position.

In second part this twister driving means carried by the lower needles comprises an arcuate rack 120 of a radius about the centre of oscillation of the lower needle (the centre of its mounting on the sides 53, 54 of the bale case 50) and whose pitch circle extended is tangent to the pitch circle of the gear 106. The teeth of the rack 120 therefore will engage the teeth of gear 106 as the lower needles are projected upwardly and drive the twister pinion 101 through the necessary number of revolutions (usually four revolutions) and so to achieve a double twist joint between the wire strands which have been laid in slot 102.

The needle mechanism 200 comprises a pair of upper needles 201 carried from the needle yoke 202 rocking about a pivoted axis member 203 anchored to the base plate 65, and a coacting pair of lower needles 204 carried from a U-shaped needle yoke 205 the upper ends of whose arms rock about pivotal axes 207 founded upon the sides 53, 54 of the bale case. As clearly appears it is the upper pair of needles which bears the twister mechanism 100 and the lower pair which bears the twister driving lugs and racks 115, 120 (see especially Fig. 1).

The upper needles 201 and yoke 202 are preferably both constructed as light alloy castings having channel cross-sections for attaining strength with lightness. Viewed in side elevation as in Fig. 1, they have rectilinear extent and an approximately right-angular relationship, the bodies of the needles 201 being rigidly secured to the body of the yoke by any suitable means such as machine screws or bolts 210. The arms of the yoke are placed more widely apart at axis 203 than at their extremities and they are appropriately cross-braced as shown. The needles project downwardly in vertical planes and are straight to the region of mounting the twister mechanisms 100 but their lower portions 215 which constitute their points are offset rearwardly from their main bodies to some extent, the better to mount and operate those elements of the free end control mechanism 500 which they carry.

Figure 17:
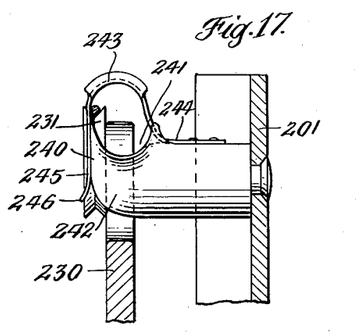
Fig. 17 is an enlarged detail view of a free end strand receiving hook carried by the body of the upper needle, shown as receiving from the sectioned point of the lower needle, the free end strand, which at the time is the bight portion of the needle loop.
Figure 18:
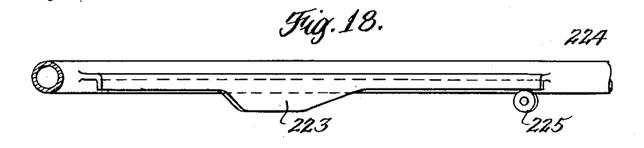
Fig. 18 shows in schematic plan upon its mounting one of the cams employed to bring about the transverse movement of the lower needles with respect to the upper needles as required to effect movement of the needles from the position shown in Fig. 14 to that shown in Fig. 15.

The bodies of the lower needles 200 like the racks 120 which they bear are formed arcuately on radii centred on the axes 206 which mount the yokes 205 and the needles are non-rotatably connected to the bight of this yoke whereby their arcuate relationship to axes 206 is maintained. They are, however, shiftable laterally toward and from each other on the bight of the yoke. This arrangement is shown especially in Fig. 3 in which 220 is the bight of the yoke; 221 are split collars constituting the bases of needles 204; 222 are keys between the collars or sleeves and the bight of the yoke for maintaining the arcuate relationship between the needles 204 and the racks 120 with the axes 206; 223 are cams mounted upon needle guards secured to the bottom wall 252 of the bale case, for laterally moving the needles toward and from each other; 225 are cam followers borne by the sleeves 221; 226 are springs surrounding the bight 220 of the yoke and pressing the sleeves 221 and the followers 225 forward and upon cams 223; and 227 are split collars adjustably clamped about the bight 220 and constituting reacting abutments for the springs 226. The shape of the cams is such that needles 204 normally lie a distance apart which presents their points in the vertical planes of the wire ties so that when projected toward the casing and into it they will have engaged the spool strands 70 of the wire which has been extended around the bale during its formation, but shortly after entering the bale case the needles will be moved apart a distance enabling their points to pass laterally outwardly of the twister mechanism 100 carried by the upper needles, and just after they have passed the twister mechanisms 100 the needles 204 will again be moved toward each other to present their points in the plane of the tie to make the lay of the bale strand 72 of the needle loop which they form and thereafter to drive the twister mechanism 100 to effect the double twist joint 77 through inter-engagement of lugs 115 and racks 120 respectively with the cam arm 116 and twister gear 106. The points 230 of the lower needles are inwardly offset toward each other as clearly appears in Figs. 2, 3, 14 and 15 for the purpose of permitting the point rollers 231 to engage the spool strand 70 in the plane of the tie and after the outward and inward movement of the needles under the control of cams 223 to again bring the bight 74 of the loop 71 into the plane of the tie as clearly appears in Figs. 3 and 15. Rollers 231 are spaced apart to enable the bight 74 to be appropriately engaged by the upper needle. For this purpose the upper needle is provided with hook 240 riveted to its main body 201 near its upper end (see Figs. 1 and 17). The hollow 241 of the hook lies closely adjacent to the plane of the tie. The outer lower end 242 is generously rounded. A guiding in and retaining spring 243 of inverted U-form is secured by an inwardly extending arm 244 to the body of the hook 240 and arches up and over the hollow 241 to present its yielding outer arm 245 flatly against the outer end of the hook. The lower extremity 246 of arm 245 is outwardly flared in downwardly divergent relation to the outer end of 242 of the hook. Thereby when lower needle point 230 presents the bight 74 of the needle loop to the divergent surfaces 242, 246 the loop lifts the arm 245 of the spring, passes into the hollow of the hook, remains there when the needle point 230 withdraws, and is retained through the reengagement of the spring arm 245 with the end of the hook. The hollow of the hook is generously rounded in the shaded area bordering it and the over-arching bight of spring 243 is also downwardly convexed whereby to afford unobstructed passage over the hook and past it of the deformed and extremity of the free end strand 75 as its slack is taken up by arm 501.

The primary timing mechanism 300 is comprised of a continuously rotating driven member 301 and an intermittently operated driven member 302 which together constitute a one revolution and stop clutch. The driving member 301 derives it spower through a chain and sprocket connection 303 with the crank shaft (not shown) from which the plunger 55 which does the hay compressing derives its reciprocation. Such an arrangement is well known. One is shown in copending application Serial No. 268,424, filed January 26, 1952, by E. B. Nolt and R. R. Eby. Suffice it to say here that the timing with respect to the plunger reciprocation is such that the clutch 301, 302 may make one revolution in precisely the time required for the plunger to make one baling stroke. Clutch 301, 302 is of the detent control type in which an interiorly located detent is rockable through an outwardly-projecting end 310 to disengage it but is interiorly biased by a spring into driving engagement. Normally when the mechanism is at rest the end 310 is engaged by the end of a lever 311 which is pressed clockwise into its engaging position by a compression spring 312. Lever 311 is mounted on an axis 313 borne in bearing brackets 314. A companion or bell crank arm 315 connected with it serves for operating it counter-clockwise to free the end 310 of the clutch detent for engagement with the driving of member 302.

The function of the bale length metering mechanism is the control of the primary timing mechanism 300. The metering mechanism comprises the usual metering wheel 401 which engages and is driven by the bale through a crank 402. This wheel operates push bar 403 to drive a depending projection 404 which bears in its rearward position against the upper end of lever 315. This it does as wheel 401 nears or reaches a complete revolution, so measuring a length of bale substantially equal to its peripheral extent. As explained, rocking lever 315 counterclockwise releases the clutch detent and starts the timing mechanism on a revolution. The rearward end 405 of push bar 403 normally rests in the dotted line position shown in Fig. 1 upon the hub or sleeve 320 of driven member 302. Upon this member turning through a fraction of a revolution an axially projecting pin 406 which underlies the over reaching end of bar 403, engages its undersurface and lifts the bar thereby lifting the depending actuating lug 404 above the upper end of lever 315 and permitting spring 312 to rock it clockwise and beneath or to the rear of lug 404, thereby restoring mating lever 311 to normal position and placing its end again in the path of detent end 310, with the result that timing mechanism 300 is limited to but one revolution for each actuation by the metering mechanism 400. As a new bale is formed the metering wheel first retracts bar 403 and then readvances it. In the retraction the inclined-forward face of lug 404 slides over the top of lever 315 and so once more drops its rearward face behind lever 315, ready to effect the next succeeding operation of the timing mechanism 300.

Operated directly from the primary timing mechanism 300 through a transversely extending shaft 330 supported from the bale case in bearings on pedestals 331 and 332 are both the needle means 200 and the free end control mechanism 500. In fact, the driving and driven members 301 and 302 of timing mechanism 300 are both mounted on this shaft, the driving member 301 to revolve normally freely upon it as a journal, and the driven member keyed to the shaft to drive it in the general manner described in the copending application above referred to. Pedestals 331 and 332 are anchored to base plate 65 and so to the bale case.

The free end control mechanism comprises a rockable slack control lever 501 carried from a pivot 502 at the upper end of a pedestal 503 rising from base plate 65 and operating in conjunction with the free end stop and clamp 510 mounted on the point portion 215 of upper needle 201. There are two of these mechanisms 500 of course, one for each of the upper needles 201. The slack control lever 501 is oscillated from its position of rest shown in full lines in Fig. 1, where it maintains the free end strand 75 taut while its extremity 76 is in the grip of clamp 510, to a rearward position where strand 75 is loosed from engagement with lever 501. This rocking is by a link connection 511 of the upper end of lever 501 with reciprocable connecting rod 512 slidably borne in a bearing 513 at the upper end of a pedestal 514 also founded on plate 65. A cam 520 revolved by shaft 330 effects this reciprocation through its bearing upon cam follower 521, in cooperation with the retracting compression spring 522 carried by the rod 512 between follower 521 and bearing 513. Thus slack lever 501 removes slack and pulls the free end length 75 taut under power while it releases the tautness under spring pressure.

Figure 16:
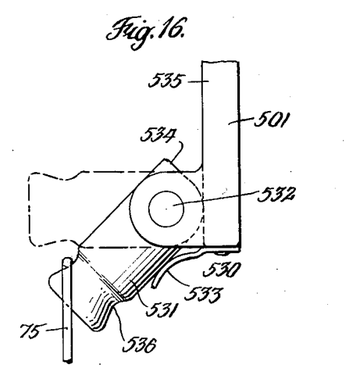
Fig. 16 is a detail of the free end engaging element of the slack-take-up mechanism which operates upon the free end length, the view being one of vertical elevation taken as the free end length is about to become disengaged from the mechanism.

The engaging end 530 of lever 501 is shown in detail in Fig. 16. It comprises a vertically collapsible pin 531 pivoted to the lever 501 at its lower end upon an axis 532 disposed in all attitudes of the lever 501 generally longitudinally of the bale case. Normally a spring 533 biases pin 531 to the dotted line position shown in which the angular abutment 534 projecting radially from the axis 532 and aubts the adjacent inner face 535 of lever 501. Beneath the abutment 534 however, the axis end of the pin 531 is rounded on a radius permitting the pin to be collapsed against the bias of spring 533 to the position shown in full lines. The strand-engaging end of the pin is circumferentially grooved as at 536 to engage free end strand 75 in the groove. In counterclockwise rocking to draw the strand 75 taut the tension drag on the pin is generally in line with its mounting axis 532, and the pin will therefore remain at right angles to the lever as shown in full lines in Fig. 1 and dotted lines in Fig. 16. So soon, however, as drag is applied at right angles to axis 532 as by a downward movement of the strand 75 incident to downward movement of the upper needles and clockwise rocking of lever 501, pin 531 will collapse to position shown in full lines in Fig. 16 and strand 75 can and does slip out of groove 536 and out of engagement with lever 501.

Figure 1:
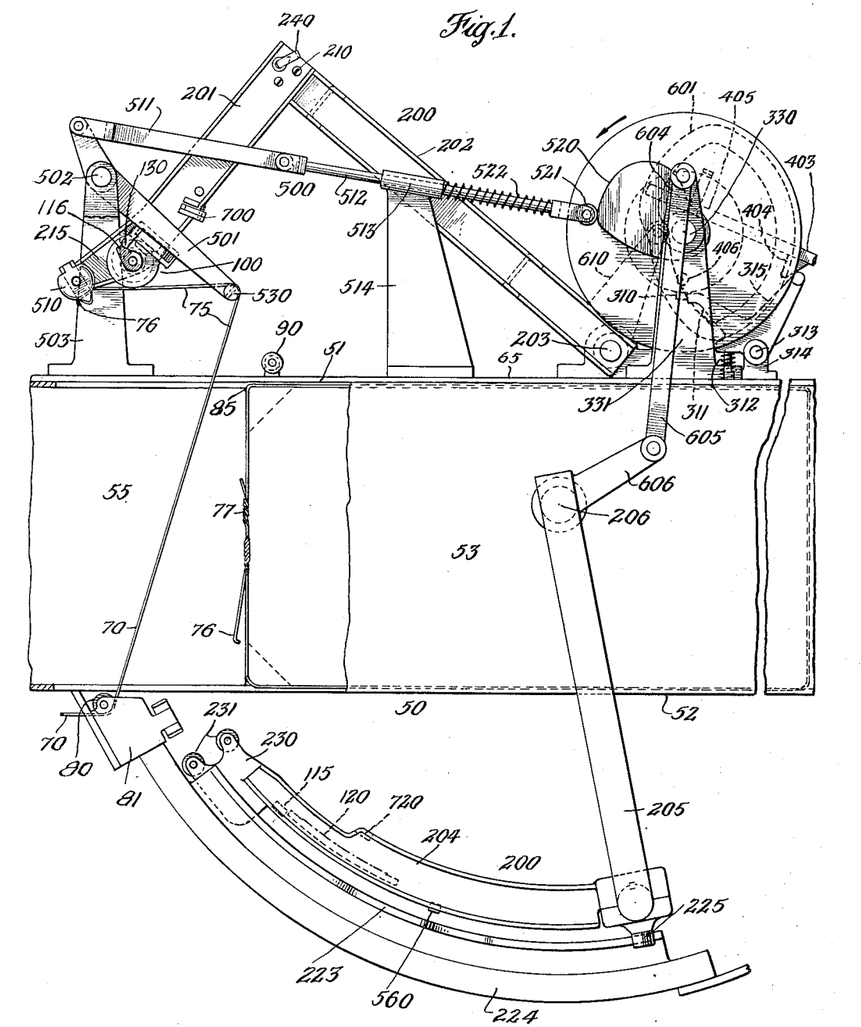
Fig. 1 is a side elevation of our mechanism as mounted upon the bale case of an automatic baler with portions of the bale case cut away to the plane of the tie in order that the tie itself and the wire leads for the new tie may be the more clearly followed.
Figure 2:
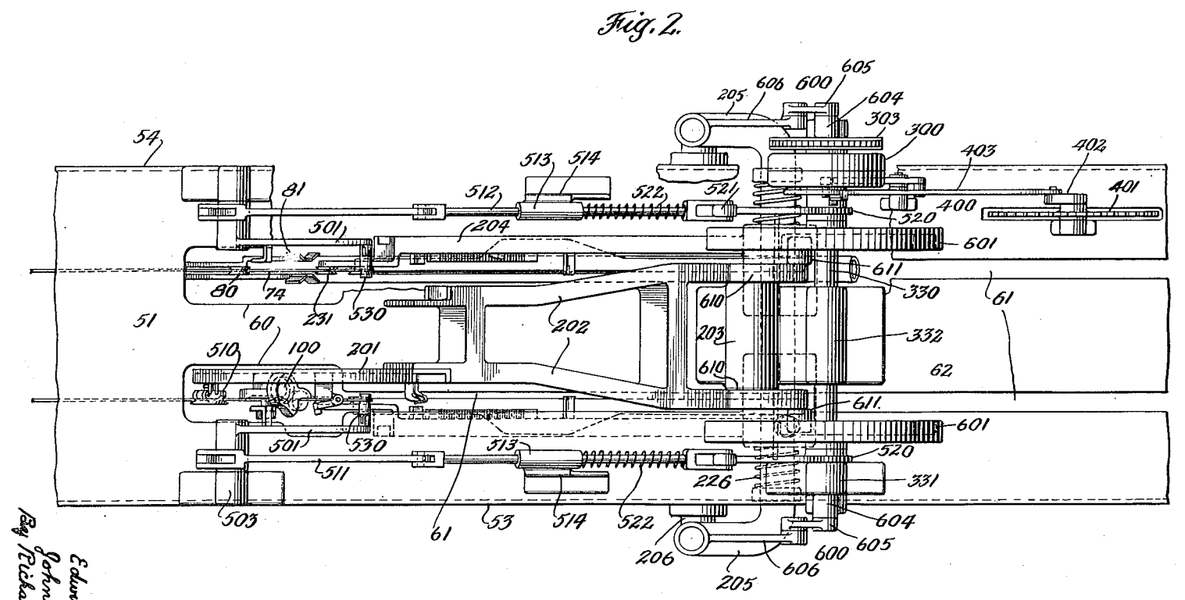
Fig. 2 is the top plan view showing the timing and needle operating mechanisms, and also with portions of the bale case cut away to show more fully the relationship of the lower needles to the upper needles.
Figure 3:
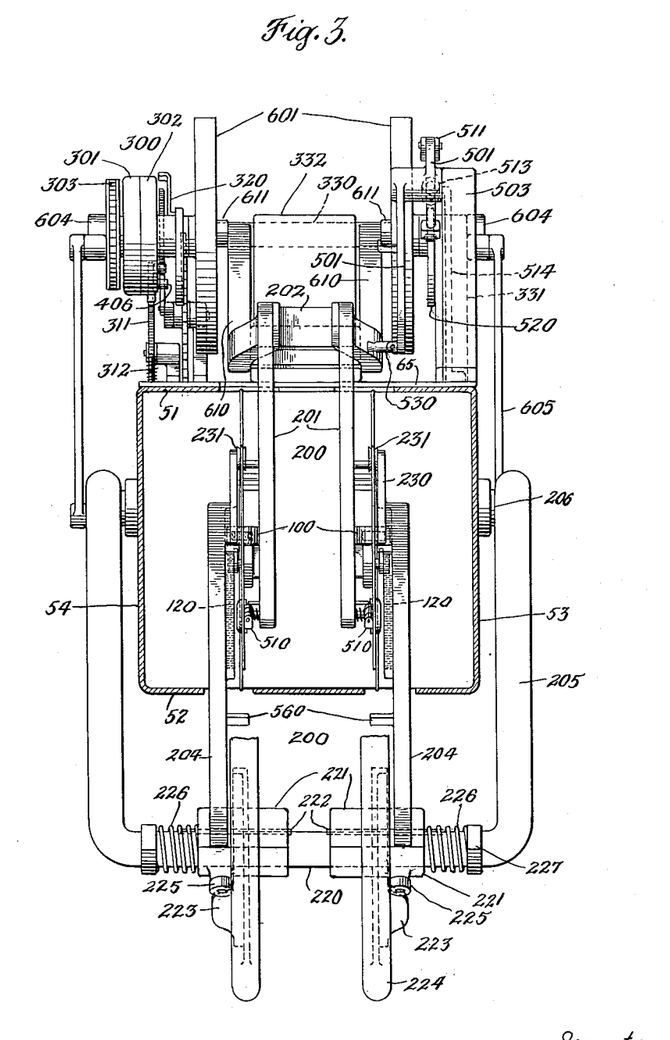
Fig. 3 is a vertical transverse section through the bale case looking forwardly, that is to say toward the rear end of a completed bale, or toward the delivery end of the baler, showing the upper needles all the way in the bale case with the twister mechanisms carried by them in the medial horizontal plane which they occupy at the time of twisting the joints, and showing the lower needles about three-fourths of their travel through the bale case, in the positions which they occupy just after they have completed the lay of the bale strand and just as they are about to engage and drive the twister mechanisms.
Figures 4, 5, 6, 7:
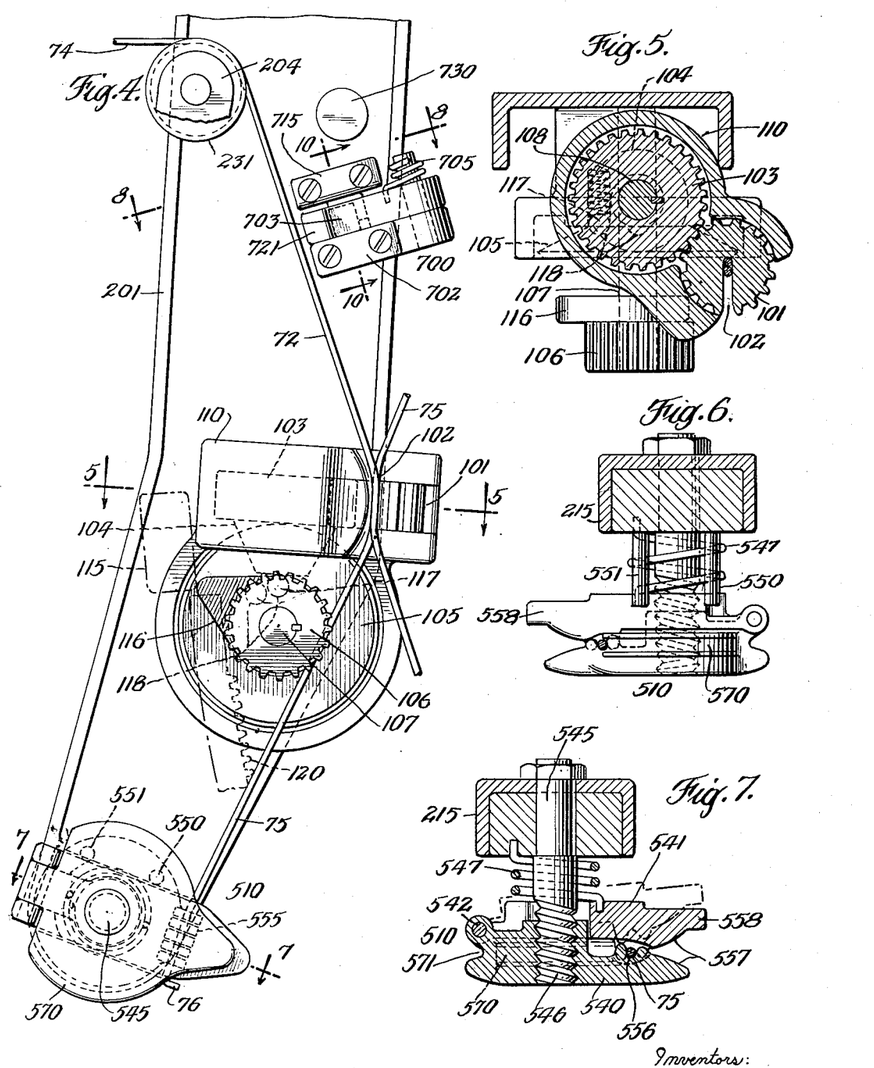
Fig. 4 is an enlarged side elevation of the main body of one of the upper needles, of a point portion of one of the lower needles, and of those portions of the free end strand and the bale strand which constitute the lays in the twister mechanism as they have been achieved at the time the parts have the relative positions shown in the cross section of Fig. 3.
Fig. 5 is a substantially horizontal section of a twister mechanism taken on line 5—5 of Fig. 4 and looking in the direction of the applied arrows.
Fig. 6 is a plan view of the free end clamp located at the point or lower extremity of an upper needle, showing the lower end of the needle in substantially horizontal cross-section and revealing the mounting of the clamp upon the needle but showing the parts in the positions which they occupy just after first engaging the free end strand.
Fig. 7 is a substantially horizontal cross-section of this free end clamp of Fig. 6, a view taken on line 7—7 of Fig. 4 looking downwardly and showing the parts in the relative positions they occupy when the clamp is in the attitude shown in Fig. 1 and in Fig. 4, and the extremity of the free end strand is firmly and fixedly held by the parts.
Figures 8, 9, 10, 11, 12, 13, 14:
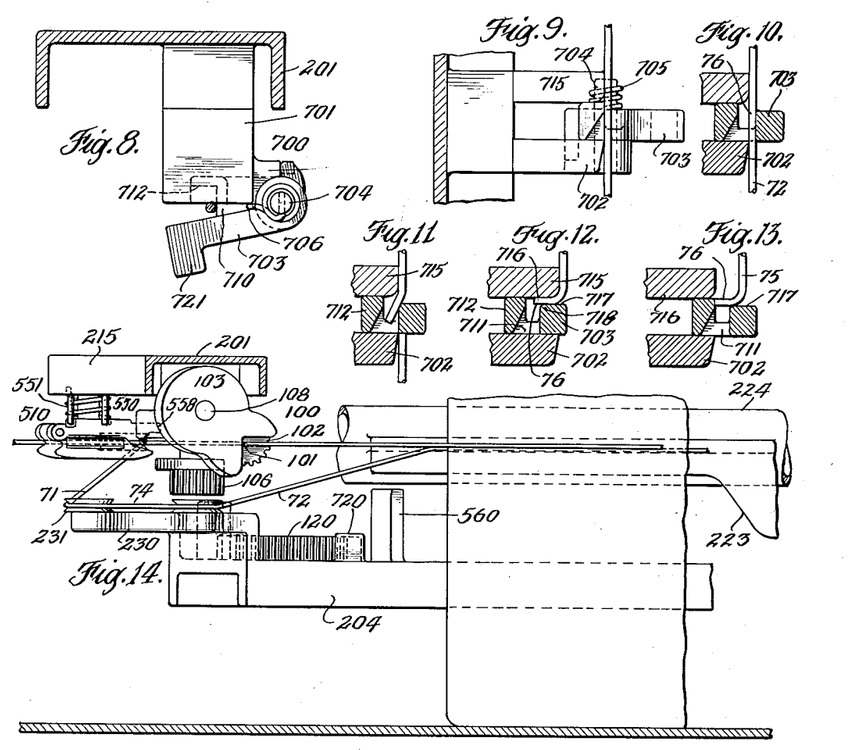
Fig. 8 is substantially a plan view of the cutter mechanism carried by the upper needle, a view from line 8—8 of Fig. 4.
Fig. 9 is a front elevation of the cutter, a view taken from the left of Fig. 8.
Figs. 10, 11, 12 and 13 are a series of transverse sections of the cutter taken in the plane designated 10—10 of Fig. 4 and showing in succession the relation of the parts at the inception of the cut, just after the cut has been completed, just after the extremity has been formed to the shape desired for engagement with the clamp of Figs. 6 and 7, and just after the cutter blades have been retracted and the formed extremity has been freed of the forming parts.
Fig. 14 is the fragmentary plan view on an enlarged scale showing the relationship of the upper and lower needle points and the relationship of the needle loop to the already laid free end at the time the point of the lower needle becomes juxtaposed to the twister mechanism carried by the upper needle.

The free end stop and clamp 510 is shown in detail in Figs. 4, 6 and 7. Its principal elements are a pair of gripping and clamping jaws 540 and 541 hinged firmly together for relative movement about an axis 542 at one end, and provided with raised and grooved free end strand engaging faces 543 at the other. The jaws are mounted on the point portion 215 of the needle by means of a rigid laterally projecting mounting stud 545 having a coarse threaded engagement 546 with the central portion of the outer jaw 540. The inner jaw 541 is free of direct engagement with the stud 545 with the result that it may be moved toward and from the member 540. A combined compression and torsional spring 547 interposed between the point 215 of the needle and the body of the jaw 541 normally through its compression retains jaws 541 and 540 closed together, and through its torsional tension biases these members clockwise as viewed in Fig. 4. When member 540 is rotated upon stud 545, under its bias the coarse thread 546 will move both jaws 540 and 541 axially outwardly and thereby release some of the compression of spring 547, but when rotated in the opposite direction the threads will increase this compression and increase their grip. Limits of rotation are imposed by a pair of pins 550, 551 projecting from the body of the point 215 into the rotative path of jaw member 541 and alternately engaging opposite sides of the strand gripping end of the jaw, the one 550 to limit the counterclockwise movement and the other 551 to limit the clockwise movement. Radially extending grooves 555 alternately on the opposed gripping surfaces 543, and whose edges may be either curvilinear or sharp in appropriate degree, serve to deflect or tend to deflect and to resist the drag of the wire strand 75 transversely of them. Mating transverse grooves 556 transversely of radial grooves 555 accommodate the strand 75 to be held by the jaws. Outwardly of the gripping surfaces 543 the ends of the jaws 541, 540 are divergently flared as at 557 the more readily to receive and to be parted by a wire strand 75 which needs to be gripped by them.

The outermost end of the jaw 541 is radially extended beyond the flared portion 557, as at 558 in order to enable this jaw to be engaged by a clamp operating member. Such a clamp operating member is provided on each lower needle in the form of a cam lug 560 which projects inwardly and lies on an arc such that its cam end, as the lower needle approaches its upward extreme of movement, will strike the extension 558 on its under side and thereby move jaw 541 from the closed full line position shown in Fig. 7 to the open dotted line position. When the clamp is opened the extremity 76 of strand 75 is released by and freed from the clamp.

Each side of the jaw 540 bears a pair of peripherally grooved guiding segments 570 of a radius at the bottom of the groove substantially equal to the radial distance of the strand receiving grooves 556 from the axis of mounting stud 545, whereby to guide and feed the strand 75 to and through groove 556 whenever the strand lies against the clamp at points other than the gripping surfaces 543 and the divergent ends 557. The hinge end of jaw 540 is provided with a groove 571 which feeds into the grooved sectors 570 just as the groove of the sector 570 feeds into the diverging ends of the jaws. A strand engaging the groove 571 finds its way by way of the grooves in 570 to the points 557 and ultimately into the retaining grooves 556 of gripping surfaces 543.

The needle drive means 600 associated with the shaft 330 of the timing mechanism comprises a pair of slotted cams 601 for driving the upper needles 201 and a pair of cranks 604 for driving the lower needles 204. The cranks 604 are connected with the opposite extremities of the shaft 330 and drive the lower needles through pitman connections 605 with crank arms 606 having a rigid connection with the mounting axis 206 of yokes 205. The cams 601 are mounted intermediate the ends of shaft 330 and flanking the elongated central main bearing pedestal 332. They drive the upper needles through crank arms 610 having a rigid connection with the axis end of yoke 202 and hooked into the slotted cams 601 through axially projecting cam followers 611. The shapes of cams 520 and 601 are such as to introduce periods of dwell in the movements of free end control levers 501 and the upper needles 201, while the cranks 604 drive the lower needles 204 uninterruptedly into and out of the bale case.

A cutting mechanism 700 which is provided on each needle 201 for severing the bale strand 75 from the spool strand 73. It is shown in detail and in various phases of its operation in Figs. 8 to 13. The mechanism as a whole is borne rigidly from the body 201 of the needle by means of a base 701 supporting its fixed jaw 702 and an anvil member 715. The movable jaw 703 is hingedly connected at 704 to the fixed jaw and biased to open away from the fixed jaw by a spiral spring 705 affixed to the axis 704 of the hinge and having an end 706 which underlies and exerts opening pressure upon the movable jaw 703. The cutter 700 as clearly appears in Figs. 4 to 8 is borne by body 201 of the needle in such position that the jaws open toward the bale strand 72 and in the plane of that strand and the needle loop at large as it is swept upwardly through the bale case and in such close juxtaposition to the body of strand 72 that as the loop is extended upwardly and forwardly strand 72 is swept between the jaws from the position shown in Fig. 4 to the position shown in Fig. 8. There it lies against the bottom 710 of an open groove 711 between the jaw 703 and an integrally carried lower extension 712 therefrom. Immediately opposite the fixed jaw 702 of the cutter and on the opposite side of the movable jaw 703, the fixed anvil member 715 whose adjacent face 716 is spaced from the adjacent space 717 of the movable jaw 703 by a distance slightly greater than the diameter of the wire strand being operated upon. The under corner 718 of surface 717 like the near corner of anvil 715 is also rounded. The result as clearly appears in the sequence of operations showing Figs. 10 to 13, is that just after strand 72 is cut between fixed and movable jaws 702, 703 the extremity 76 is bent over the anvil 715 substantially at right angles to the main body of the strand to constitute the extremity a deformed end. The groove 711 is divergent toward the fixed cutter to provide clearance for the end deformed during the bending. The extension 712 of the movable jaw 703, unlike the latter, is of the full width of the space between the fixed jaw 702 and the anvil 715 with the result that the deformed extremity 76 upon the retraction of the movable jaw 703 by spring 706 is engaged by the extension and so is ejected from both cutter and anvil and placed in the clear, ready to be taken under control by the free end control mechanism 500.

Operation of the cutter 700 is achieved through engagement of a cam ended lug 720 carried by the lower needle with the outwardly projecting end 721 of the movable jaw 703. The interengagement of the parts 720, 721 takes place as the lower needles approach closely the upper extreme of their movement. The positioning of the strands to be cut is aided by a pin 730 of relatively large diameter projecting outwardly into the path of the needle loop as it is extended upwardly and forwardly. It is located just above the cutter 700 and its circular cross-section is substantially tangent to a line truly transversely of the cutter jaws and extending through the bottom of the groove 711 of the movable cutter jaw 703. The strand to be cut is thus laid the more truly across the jaws of the cutter and the associated anvil and thereby the cutting and forming operations and subsequent discharge of the free end are carried out in a more orderly manner than if the strand were angled sharply in the cutter jaws themselves.

Overall operation

The overall operation will be best understood by following through a complete cycle and describing the movements of the parts in the succession in which they occur. At the start, of course, all parts are at rest. If the machine has been baling it may be assumed that an advanced bale has been freshly completed and tied and that the automatic baler is about to commence the formation of the next succeeding bale. This is the commencement of the rest period of the automatic tying mechanism. The parts are then in the relative positions depicted in Fig. 1 and the plunger (not shown) has moved back and its next movement will advance the first wad of hay for the next succeeding bale.

With the parts in the position shown, the spool strand 70 from the wire coiled over a guide roll 80 in the lower needle guide 81 extends upwardly and forwardly to the region where it constitutes the free end strand 75. The bent-over end extremity 76 of this free end strand 75 is in the grip of the free end clamp and stop 510. The body of the free end strand is hooked over the grooved end of pin 530 carried by the slack take up lever 501 and the free end strand 75 as well as the spool strand lead 70 are relatively taut, for the tension in spool strand 70 is substantial. In automatic baling machines means (not shown) are usually provided for suitably adjusting this tension. So drawn taut the free end strand 75 occupies an acute angle, the medial line of which is generally in line with the pivotal axis of the collapsible pin 530 and the pin therefore does not collapse but remains in its right angular position resisting tension in the wire.

The length of the free end strand from the top of the bale case around pins 530 and to its deformed extremity 76 is substantially equal to the length required to reach from the upper rear corner of a bale through the double twist wire tie and beyond sufficiently to enable the double twist wire tie to be made in juxtaposition to the area of the bale while the extremity 76 is being held for the twist in a position below the medial horizontal plane of the bale case. Such a length is shown in the completed tie appearing in Fig. 1 and reaching from the upper corner 85 of the bale through the joint 77 and to the deformed extremity 76. Generally speaking it is a length which will reach substantially three-quarters of the way through the bale case when the joint 77 is to be centred as shown in the medial plane of the case.

As has been explained, clamp 510 when in the position shown acts as a positive stop. This is because it is rotated counterclockwise when the free end 75 is first drawn taut. It will be presently explained how this occurs through the operation of the tier in effecting a tie. For the present it is sufficient to understand that when tension is applied to the strand 75 in the forward direction clamp 510 is rotated to its counterclockwise stop position wherein it is retained by its counterclockwise stop 550 (Figs. 4 and 6). Were the mechanism being initially threaded at the very start of baling operations the end 76 of the free end strand 75 would be bent with a pair of pliers and the extremity inserted between jaws 540, 541 (Fig. 7) and pressed into the retaining groove 556 by hand, its body then slipped over the end of pin 530, and spool strand 70 pulled taut through such spool tension device as may have been provided. If such threading were done with clamp 510 retracted by spring 547 against its clockwise stop 551 the strand 75 after insertion would be run through the groove of the then lower sector 570 and on through groove 571 (follow in Figs. 6 and 7) forwardly to pin 530 and then through the bale case. Then when the strand is drawn taut the strand slips through the groove 556 until the bent end abuts the sides of the jaws 540, 541 on which it lies, whereupon the body of the strand acts on the clamp as if it were a pulley, rotating it counterclockwise until the opposite side of jaw 541 fetches up and is stopped against the pin 550, strand 75 then extending forwardly free of the pulley-like sector 570. As this counterclockwise movement is continued the clamping pressure exerted by spring 547 is progressively increased, for the coarse threads (and these may be made double or tripple if desired to increase the axial movement) move both jaws progressively nearer to the body of the needle point 215 and so progressively increase the compression of the spring. The spring pressure increased from its minimum to its maximum through this movement, changes the clamping grip of the jaws and the radially grooved jaw surfaces 543 from a minimum to a maximum. At maximum clamping pressure the grip upon the free end is at such height that combined with the resistance to strand withdrawal occasioned by the angularly bent extremity 76, that even though the tension in the free end strand is multiplied during the successive stages of bale build up, it may not be dislodged. This hold on the free end is augmented both by the bend around pin 530 and the reverse bend in the free end strand which occurs after the new bale has commenced and the forward portion of 75 is carried under the free end strand guide 90 as shown in Fig. 19.

Figures 19, 20, 21, 22:
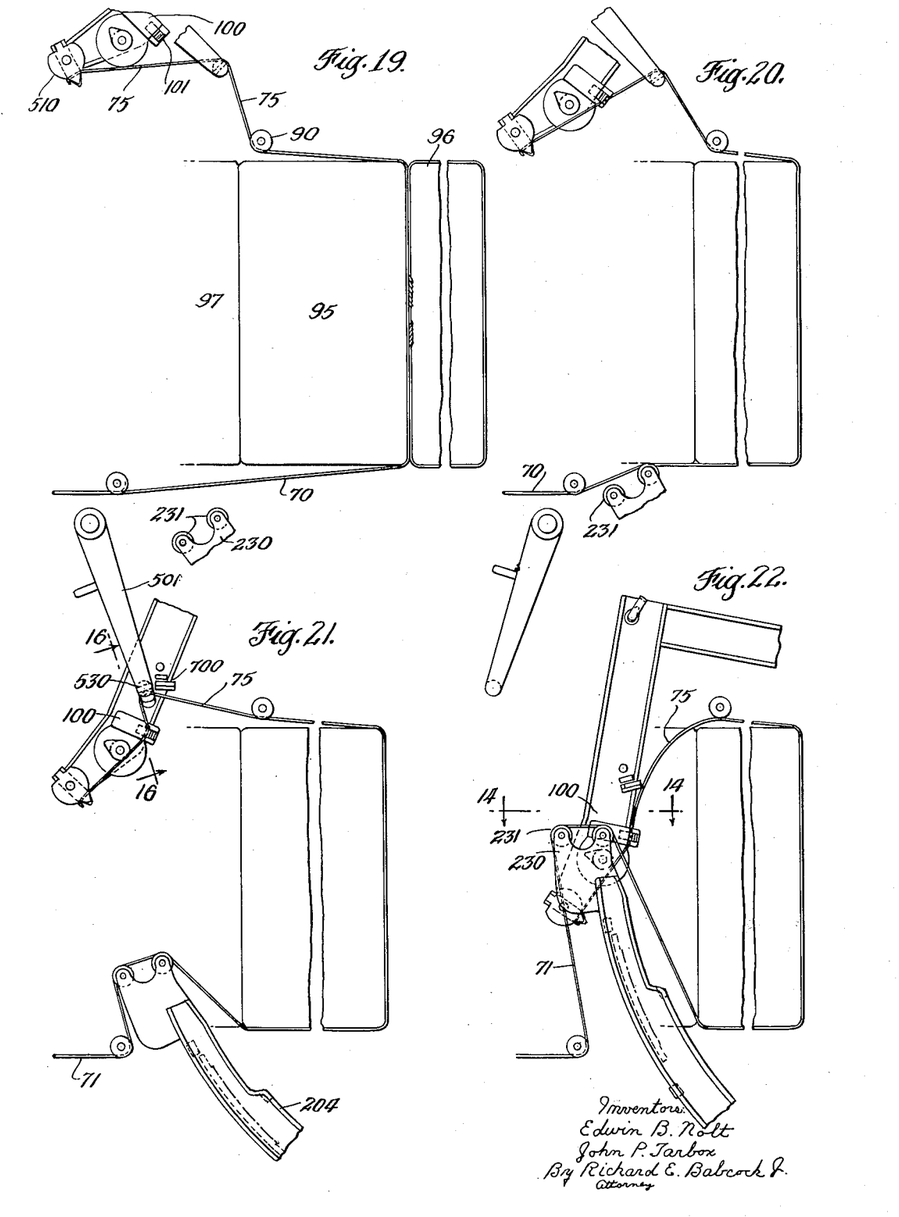

The inception of the new bale is depicted diagrammatically in Fig. 19. Here the first wad of hay to constitute the new bale is shown at 95 as having engaged the spool strand 70 and carried it from the position shown in Fig. 1 forwardly to reach around the forward end of the new bale. Here the free end strand 75 has been carried forwardly and reversely bent under the guide 90 there to join the reach of the spool strand 70 around the end of the new bale. The old bale 96 has been advanced toward discharge by the thickness of the new wad 95 as pushed home. A second wad 97 is incompletely diagrammed but assumed to be on the way into place. This condition continues during the addition of all the wads necessary to complete the next succeeding bale.

During this period there is no movement of any part of the mechanism save the bale length metering mechanism 400. Progressively as the spool strand 70 is drawn upon to provide the ever increasing length of wire required for the tie and progressively as the metering wheel 401 is revolved, push bar 403 (Figs. 1, 2 and 3) is first retracted forwardly and then pushed gradually rearwardly until, when it nears or reaches its extreme rearward movement, its depending shoulder 404 strikes lever 315 and moves retaining lever 311 counterclockwise. This frees the clutch detent 310 to engage the driving and driven members 301, 302 with each other when the plunger next reaches or approaches its extreme forward stroke and so not only presents its needle receiving slots in position to be threaded through by the needles, but also positions itself to be latched in that forward position if desired for one stroke period. Some automatic balers effect such a dwell of the plunger for one stroke period. Others provide sufficient length of slot in the plunger and sufficient openness of slot dimensions and so regulate the number of strokes per minute as to permit the needles to be projected and retracted and the tie to be completed while the plunger is moving in the region of its extreme forward stroke, commencing the needle movement as it aproaches the extreme and finishing the needle movement in the first stages of its recession from its extreme forward position. We contemplate applying my mechanism under either of these conditions.

The moment driven member 302 starts its revolution the needle mechanism 200 and the slack mechanism 500 commence their operations for their operating cams 601, operating cranks 604, and cams 520 are rigidly mounted on timing shaft 330. Cranks 604 operating the lower needles 204 contact the needle point rollers 231 with the spool strand 70 and initiate the formation of the needle loop 71 (see Figure 20). The radially outwardly directed portion of slotted cam 601 engaging followers 611 of arm 610 initiate the movement of the upper needles 201 toward the bale case. Simultaneously the radially inwardly curving periphery of cams 520 gradually and then more fully permits spring 522 to swing free end levers 501 counterclockwise to permit free movement of free ends by the needles 201. As the needles 201 approach the casing the free end strands 75 enter the strand receiving slots 102 of the twister mechanisms 100 carried by the needles, for these slots and the free end strands normally lie in common vertical planes.

During their continued movement, each of the needles 201 completes the lay of its free end strand as shown in Figure 21. The bight of strand is passed between the twister mechanism 100 and the cutter mechanism 700 by pin 530 of arm 501. The arm has been rotated yet further counterclockwise as the more abrupt radially extending portion of cam 520 is reached by follower 521. At this stage lower needle 204 has initiated the formation of the needle loop 71.

Soon in each case as shown in Figure 22 the rather abrupt radially outwardly extending portion of cam 601 and the revolution of crank 604 have brought the twister mechanism 100 carried by the upper needle and the point 230 of the lower needle into juxtaposition as shown in Figure 22. In the process of this movement the bight of the free end strand 75 has been entirely freed from pin 530 by reason of the downward collapse of that pin when the tension in free end strand 75 took a downward direction substantially at right angles to the axis of the pin. In fact the inception of the collapse of pin 530 and the freeing of strand 75 is commenced at the stage shown in Figure 21. The nature of the collapse and the manner of freeing has been shown in Figure 16. In the mean time also the lower needle 204 has been given a bodily movement of translation laterally outwardly through engagement of the follower 225 (see Figures 1 and 3) with cam 223 carried by the needle guard 224 (the needles on opposite sides of the casing being moved away from each other against the tension of springs 226). Thereby the fouling of the twister mechanism 100 by the needle point is avoided as is indeed any interference of the upper and lower needles with each other in their movements. In plan the parts then occupy relative positions shown in Figure 14. This relationship is maintained until the lower needle point and the twister mechanism 100 are past each other, at least until both the needle point rollers 231 and the bight 74 of the needle loop 71 are vertically beyond housing 103, whereupon cam 223 abruptly releases follower 225 and spring 226 as abruptly returns the body 204 of the needle and its point 231 to their starting positions in which the point 231 and the loop 71 carried thereby lie in the plane of the bale tie.

Figures 23, 24, 25, 26:
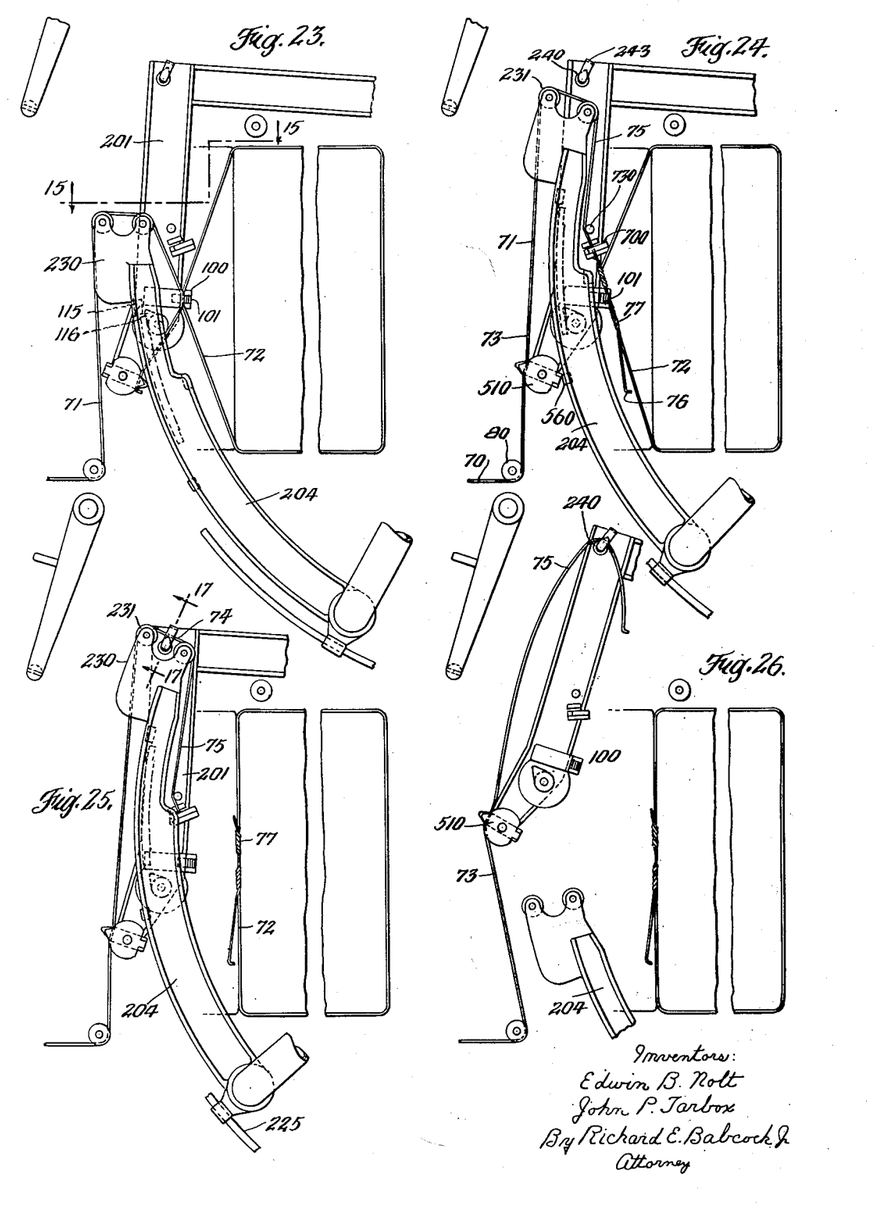
Figure 27:
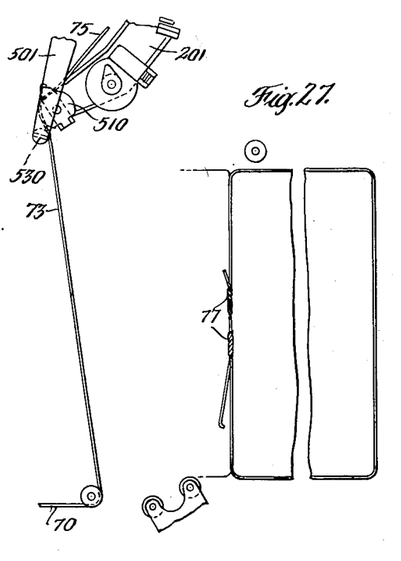

This stage of operation is illustrated diagrammatically in Figure 23. In the progress of the point 230 past the twister mechanism 100 to the position shown, the cam lug 115 carried on the body of the lower needle 204 has struck and moved the cam arm 116 sufficiently to shift the twister pinion 102 to present laterally as shown in Figures 4 and 5. It is momentarily held in this position by the first of the detents 117. This takes place just before cam 223 releases follower 225 to carry loop 71 back into the plane of the tie. Therefore upon such release, the bale strand 72 of the loop is pushed into the slot 102 and laid in that slot close to the bottom, superimposed upon the free end strand 75 all as shown not only in Figure 23 but also in Figures 4, 5 and 15. At this juncture the upper needle 201 has come to a stop and dwells with twister mechanism 100 in the medial horizontal plane of the bale case, for slotted cam 601 at this juncture has reached and is following an arcuate path of uniform radius about the axis of shaft 330. Free end lever 501 has also come to rest for its cam 520 after placing it in the extreme clockwise position (in which position it appears in each of Figures 23 to 26) has also assumed an arcuate shape of uniform radius about the axis of shaft 330. Lower needle 204 however, continues to be advanced until it approaches and reaches an extreme upward position and is then retracted by the same path on which it was projected, because its operation is from crank 604 in lieu of a cam.

Figure 15:
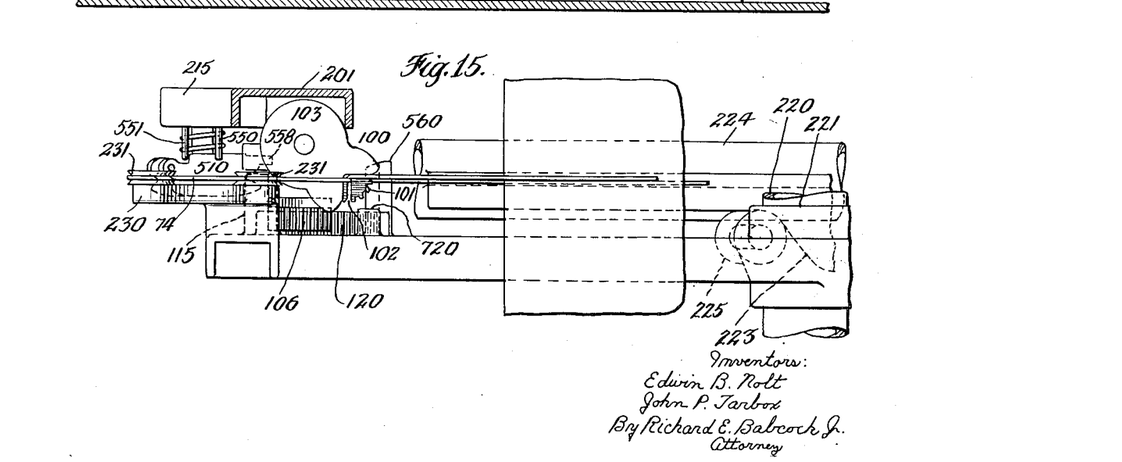
Fig. 15 is a similar view of the same parts showing their relationship after the points of the lower needle have passed the twister mechanism carried by the upper needle and the needle loop has been brought into the vertical plane of the tie to effect the lay of the bale strand of the loop in the twister mechanism. This view corresponds in relationship of parts to Fig. 4 in which the parts are still further enlarged and the lay of the bale strand is shown to have been completed.

At the stage of operations illustrated in Figures 4, 5 and 23 twister drive rack 120 carried by needle 204 is shown just about to engage with twister drive pinion 106, for the same translational movement that effected the lay of the bale strand 72 has brought rack 120 into the plane of gear 106 as clearly appears in Figure 15. The ensuing movement of needle 204 illustrated in Figure 24 therefore operates the twister mechanism to revolve twister pinion 101 to effect the desired double twist wire tie 77. After the twist pinion 101 is brought to rest with gear slot 102 once more facing forwardly and in the plane of the tie about the bale, in which position the tie 77 is free to strip forwardly as illustrated. In this position the gears are held by the second of the two spring ball detents 117.

In passing upwardly to the position shown in Figure 24 the needle loop 71 develops the free end strand 75 for the next ensuing bale through the extension of the needle loop through and above the top of the bale case. In so doing it passes this strand between the jaws of the cutting mechanism 700 and around the coacting positioning pin 730 thereby making this strand ready to be severed from joint 77 by the cutter at the proper juncture. In Figure 24 this juncture has almost been reached for not only has the twist been completed but also cam lug 560 has struck the projecting point 558 of the free end clamp 510 and opened its jaws 540, 541, releasing the deformed extremity 76 and thereby partially freeing the double twist joint 77 for collapse to the end of the bale. Released from retention in the counter-clockwise position by its grip on extremity 76, free end clamp 510 is instantly rotated clockwise by spring 547 to engage the spool strand 73 of the loop between its jaws (see Figures 4, 6 and 7 and then return to Figure 24). This it does because the relative locations of guide roller 80 for strand 70 and the rearward of the two point rollers 231 place strand 73 under tension in the path of the divergent ends 557 of the jaws, and the jaws being drawn together under decreasing tension of spring 507 as the counter-clockwise movement progresses, readily pass and receive tensioned strand 73 in groove 556.

It is at this juncture that needle 204 progresses to the extreme of its upward movement and reaches the position shown in Figure 25 while the upper needle 201 is yet at rest. It is at this juncture that camming lug 720 carried by needle 204 engages the head 721 of moveable cutter jaw 703 (see Figures 8 to 13) and closes the cutter jaws together, thus severing the free end strand 75 from the bale strand 72 and formed joint 77, which latter collapses to the end of the bale. Simultaneously point rollers 231 of needle 204 have projected the bight 74 of the needle loop past the out turned end 246 and into the hollow of hook 240 carried by needle 201 (see also Figure 17).

Their work now completed it is time for the needles to be retracted from the bale case and the parts to be reset ready for the next bale to be tied. The retraction and resetting are brought about during the closing half revolution of the primary timing mechanism 300. At the inception of it both the upper and the lower needles immediately commence their withdrawal. Cranks 604 withdraw needles 204 and cams 601 through radially inwardly directed slots emanating from the rear ends of their arcuate slots withdraw needles 202. Just at the close of the complete revolution both needles come to rest, for during the course of the revolution restoring pin 406 has lifted push bar 405 and removed shoulder 404 from behind lever 315 and the latter swinging clockwise has replaced lever 311 in the path of detent 310.

As needle 204 withdraws it leaves free end strand 75 hanging over the hook 240 and therefore withdraws free of the wire strand, engagement being reversely guided past the twister 100 by the reverse action of cam 225. Needle 201 however as clearly appears in Figure 26, carries the free end strand 75 upwardly and out of the bale case as it is retracted, strand 75 sliding over hook 240 and spool strand 73 slipping through the jaws of the free end clamp 510.

Figure 28:
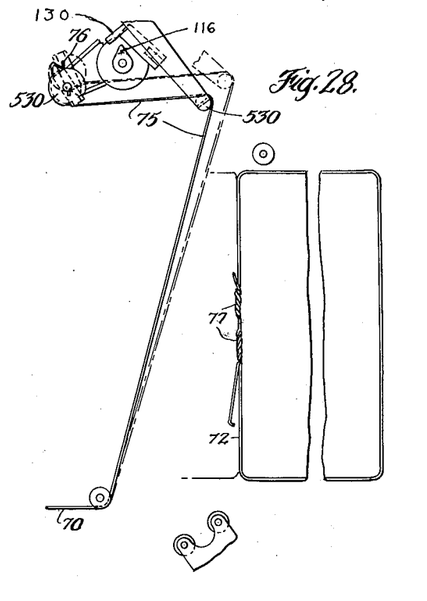

Just after the upper needle and free end clamp 510 pass out of the casing, and immediately after free end clamp 510 passes the pin 530 of the free end lever 501, the lever 501 and the pin 530 commence a counter-clockwise movement which engages pin 530 with strand 73 in line with the axis of the pin. The retraction of needle 301 and the counter-clockwise movement of lever 501 being continuous (the latter under the power drive of the abruptly radially outward extension of cam 520 from the rear end of its central arcuate portion) strand 73 is drawn upon by pin 530 and free end strand 75 drawn downwardly from off hook 240 and through the groove 556, jointly to constitute the complete length of the free end strand 75 as pin 530 approaches the dotted line position of rest shown in Figure 28. In the last stage of this movement to rest position and the full development of the length of the free end strand and its stretching taut, the deformed extremity 76 yet free shown in the full line position, soon abuts the sides of the jaws which it approaches, whereupon free end clamp 530 is rotated counter-clockwise from its full line position to its dotted line position where it comes to a stop against the counter-clockwise abutment 550. Thus is the mechanism automatically rethreaded to the condition shown in Figure 1 and it is ready to receive the first wad of a new bale and to undergo repetition of the cycle just described.

Also in this last stage of movement of arm 501 the upper needle is close to its upper extreme and in its last stage of movement (see Figure 28) it is just at this juncture that lug 130 carried by arm 501 strikes cam arm 116 of the twister and shifts pinion 101 to face slot 102 forwardly, for rack 120 driving the pinion backwards as needle 204 descends left slot 102 facing laterally, and it needs face forwardly to effect the lay as the twister pinion of the new free end strand 75.

We claim:

1. In an automatic baler comprising a bale case and a reciprocating plunger, a wire tie mechanism comprising a pair of coacting needles engageable respectively with tie strands extending on opposite sides of the bale to carry the strands to tying position in overlapped relation across the rear end of the bale, a twister for the overlapped strands borne by one of the needles, means for projecting and withdrawing the needles including an intermittent drive for the twister bearing needle arranged to afford a dwell of said needle in its tying position, and a drive for the other coacting needle coordinated with said intermittent drive to provide movement of said other needle during said dwell of the twister bearing needle; drive means for the twister comprising a driven element carried by the twister bearing needle and operatively connected with the twister, and a driving element immovably fixed on the said other coacting needle in position for driving engagement with said driven element during the dwell of said twister bearing needle.

2. A wire tie mechanism according to claim 1 in which said driven element comprises a pinion and said driving element comprises a rack.

3. A wire tie mechanism according to claim 1 in which the means for projecting and withdrawing the needles comprises a limited revolution and stop timing shaft, said respective drives for the needles being connected to and driven from said shaft drive from said shaft to the coacting needle affording nonstop projection and withdrawal movement thereof.

4. A wire tie mechanism according to claim 1 in which the twister has a strand receiving slot opening therefrom transversely to its projection movement, means being associated with said twister bearing needle for guiding one of said tie strands into the slot through and by virtue of the projection of the twister bearing needle to a tying position, together with means to produce relative movement transversely to the projection movement of the needles between the twister and the strand engaged by the coacting needle on a path which achieves the lay of said latter strand in the twister.

5. A wire tie mechanism according to claim 1 in which the twister has a strand receiving slot opening therefrom transversely to its projection movement, means being associated with said twister bearing needle for guiding one of said tie strands into the slot through and by virtue of the projection of the twister bearing needle to a tying position, together with means to produce relative movement transversely to the projection movement of the needles between the twister and the strand engaged by the coacting needle on a path which achieves the lay of said latter strand in the twister, which latter means comprehends limited transverse shifting of the coacting needle.

6. A wire tie mechanism according to claim 1 in which the means for projecting and withdrawing the needles comprises a limited revolution and stop timing shaft, said respective drives for the needles being connected to and driven from said shaft, and the drive from said shaft to the coacting needle affording nonstop projection and withdrawal movement thereof, which projection and withdrawal means comprehends twister shifting means independent of the twister driving means and operative in advance thereof.

7. A wire tie mechanism according to claim 1 in which the twister itself achieves the lay of the strand engaged by the needle which carries it through and by virtue of the movement of the needle to a tying position, together with means to produce relative movement between the twister and the strand engaged by the coacting needle on a path which achieves the lay of said latter strand in the twister, which means is embodied in part on the twister and in part on the coacting needle.

8. A wire tie mechanism according to claim 1 in which the means for projecting and withdrawing the needles comprises a limited revolution and stop timing shaft, said respective drives for the needles being connected to and driven from said shaft, and the drive from said shaft to said other coacting needle affording nonstop projection and withdrawal movement thereof, the said means for producing relative movement comprising a cam acting upon the coacting needle to deflect it first out of and then into the plane of the tie.

9. In an automatic baler comprising a bale case and reciprocating plunger, a tie mechanism in which a free end of a tie is held in relatively fixed position while the plunger projects the material of the bale against the body of the tie, including means for determining free end length entering the tie comprising a free end clamp for slideably holding the free end of a strand from which the tie is formed, means for projecting a loop of the strand around one end of the bale and into said clamp, and means for severing said strand and deforming the end thereof to an extent preventing its free passage through said clamp.

10. A bale tying mechanism according to claim 9 in which the clamp includes means responding to increased tension in the free end to tighten its hold upon the free end.

11. A tie mechanism according to claim 9 in which there is provided means to tie the free end to the loop strand in combination with means to release the clamp effective following completion of the tie.

12. A tie mechanism according to claim 9 in which there is provided means to tie the free end to the loop strand in combination with means to release the clamp effective following completion of the tie, which means comprises interengaging elements associated with the tying device and the clamp.

13. In an automatic baler comprising a bale case and needles moveable into said bale case from opposite sides thereof, means for moving said needles into the bale case in overlapping relation, a wire twister carried by one of said needles, means supporting a running strand of wire on the side of the bale case adjacent the other needle, said other needle having means for engaging said strand and carrying a loop thereof to the twister carrying needle and into the twister, and a clamp carried by said twister carrying needle to operatively engage said loop.

14. In an automatic baler comprising a bale case and needles moveable into said bale case from opposite sides thereof, means for moving said needles into the bale case in overlapping relation, a wire twister carried by one of said needles, means supporting a running strand of wire on the side of the bale case adjacent the other needle, said other needle having means for engaging said strand and carrying a loop thereof to the twister carrying needle and into the twister, a clamp carried by said twister carrying needle to operatively engage said loop, and wire severing means supported on the twister carrying needle in position to sever said loop between the clamp and the twister.

15. The combination of claim 14, including means carried by said other needle for engaging and actuating the severing means following reception of the loop in said clamp.

16. The combination of claim 14, including cam means carried by said other needle for actuating said clamp to release the free end of a preceding strand prior to reception therein of said loop.

17. In an automatic baler comprising a bale case and needles movable into said bale case from opposite sides thereof, means for moving said needles into the bale case in overlapping relation, a wire twister and drive means therefor carried by one of said needles, means fixed on the other said needle for engaging and actuating said drive means incident to such movement of the needles to overlapping relation, means supporting a running strand of wire on said bale case adjacent said other needle, said other needle having means for engaging said strand and carrying a loop thereof to the twister carrying needle and into the twister thereof, a clamp being carried by said twister carrying needle to operatively engage said loop, wire severing means supported on said twister carrying needle in position to sever said loop between the clamp and the twister, and carried by said other needle for engaging and actuating the severing means following reception of the loop in said clamp.

18. The combination of claim 17, including cam means carried by said other needle for actuating said clamp to release the free end of a preceding strand prior to reception therein of said loop.

19. In an automatic baler having a bale case and a reciprocating plunger, a wire tie mechanism comprising a pair of coacting needles engageable respectively with tie strands extending on opposite sides of the bale to carry the strands to tying position in overlapped relation across the rear end of the bale, a twister for the overlapped strands borne by one of the needle, means for projecting and withdrawing the needles, and means for driving the twister comprising a driven rotary element carried by one needle and a driving element immovably fixed on the coacting needle in position for operative engagement with the driven rotary element responsive to projection of the needles.

References Cited in the file of this patent

UNITED STATES PATENTS

| | | |
|---|---|---|
| 761,305 | Johnson | May 31, 1904 |
| 1,031,444 | Heim | July 2, 1912 |
| 1,889,372 | Nolan | Nov. 29, 1932 |
| 2,173,403 | Trimble | Sept. 19, 1939 |
| 2,622,508 | Hill | Dec. 23, 1952 |